(12) United States Patent
Yamamoto et al.

(10) Patent No.: US 8,876,962 B2
(45) Date of Patent: Nov. 4, 2014

(54) AQUEOUS INK, INK CARTRIDGE, AND INK JET RECORDING METHOD

(75) Inventors: Masashi Yamamoto, Yokohama (JP); Shuichi Okazaki, Fujisawa (JP); Kouhei Nakagawa, Kawasaki (JP); Tsuyoshi Kasai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 13/572,838

(22) Filed: Aug. 13, 2012

(65) Prior Publication Data

US 2013/0063533 A1 Mar. 14, 2013

(30) Foreign Application Priority Data

Sep. 8, 2011 (JP) .................................. 2011-195800

(51) Int. Cl.
*C09D 11/02* (2014.01)
*C09D 11/322* (2014.01)
*C09D 7/02* (2006.01)

(52) U.S. Cl.
CPC ............... *C09D 11/322* (2013.01); *C09D 7/02* (2013.01)
USPC ...................................... 106/31.6; 106/31.86

(58) Field of Classification Search
USPC ............................................ 106/31.6, 31.86
See application file for complete search history.

(56) References Cited

U.S. PATENT DOCUMENTS

| | | | |
|---|---|---|---|
| 4,756,963 A | 7/1988 | Yamamoto et al. | |
| 4,780,348 A | 10/1988 | Yamamato et al. | |
| 5,082,496 A | 1/1992 | Yamamoto et al. | |
| 5,123,960 A | 6/1992 | Shirota et al. | |
| 5,127,946 A | 7/1992 | Eida et al. | |
| 5,130,723 A | 7/1992 | Yamamoto et al. | |
| 5,167,703 A | 12/1992 | Eida et al. | |
| 5,178,671 A | 1/1993 | Yamamoto et al. | |
| 5,213,614 A | 5/1993 | Eida et al. | |
| 5,215,577 A | 6/1993 | Eida et al. | |
| 5,215,578 A | 6/1993 | Eida et al. | |
| 5,258,505 A | 11/1993 | Eida et al. | |
| 5,415,686 A | 5/1995 | Kurabayashi et al. | |
| 5,451,251 A | 9/1995 | Mafune et al. | |
| 5,482,545 A | 1/1996 | Aoki et al. | |
| 5,571,313 A | 11/1996 | Mafune et al. | |
| 5,728,201 A | 3/1998 | Saito et al. | |
| 5,911,815 A | 6/1999 | Yamamoto et al. | |
| 6,003,987 A | 12/1999 | Yamamoto et al. | |
| 6,007,182 A | 12/1999 | Matsubara et al. | |
| 6,027,210 A | 2/2000 | Kurabayashi et al. | |
| 6,062,674 A | 5/2000 | Inui et al. | |
| 6,174,354 B1 | 1/2001 | Takizawa et al. | |
| 6,186,615 B1 | 2/2001 | Sato et al. | |
| 6,281,917 B1 | 8/2001 | Katsuragi et al. | |
| 7,381,257 B2 | 6/2008 | Takayama et al. | |
| 7,705,071 B2 | 4/2010 | Nakagawa et al. | |
| 7,854,798 B2 | 12/2010 | Udagawa et al. | |
| 2008/0182083 A1* | 7/2008 | Oyanagi et al. | 428/195.1 |
| 2008/0233362 A1* | 9/2008 | Kato et al. | 428/195.1 |
| 2009/0258145 A1 | 10/2009 | Mukae et al. | |

FOREIGN PATENT DOCUMENTS

| | | |
|---|---|---|
| EP | 2 075 292 A1 | 7/2009 |
| EP | 2 169 019 A1 | 3/2010 |
| JP | 2008-266568 A | 11/2008 |
| JP | 2010-001478 A | 1/2010 |
| JP | 2010-248287 A | 11/2010 |

OTHER PUBLICATIONS

European Search Report dated Apr. 29, 2014, in European Appln. No. 12005927.4.

* cited by examiner

*Primary Examiner* — Veronica F Faison
(74) *Attorney, Agent, or Firm* — Fitzpatrick, Cella, Harper & Scinto

(57) ABSTRACT

Provided is an aqueous ink capable of recording an image achieving a high level of both of color developability and lightfastness. The aqueous ink includes a first pigment and a second pigment. The first pigment is C.I. Pigment Yellow 213, and the second pigment is at least one selected from the group consisting of C.I. Pigment Yellows 93, 128, 138, 151, 155, 180, and 215. The content A (% by mass) of the first pigment and the content B (% by mass) of the second pigment based on a total mass of the ink satisfy a relationship of $0.1 \leq A/(A+B) \leq 0.9$. The ink further includes a water-soluble organic solvent having an SP value (unit: $(cal/cm^3)^{1/2}$) determined by Fedors' method of 11.0 or more and 16.0 or less.

12 Claims, No Drawings

AQUEOUS INK, INK CARTRIDGE, AND INK JET RECORDING METHOD

BACKGROUND OF THE INVENTION

1. Field of the Invention

The present invention relates to an aqueous ink having a yellow hue suitable for ink jet recording, and an ink cartridge and an ink jet recording method each using the aqueous ink.

2. Description of the Related Art

In recent years, it has been demanded that an image recorded by an ink jet mode have higher lightfastness. To cope with such growing demand, an investigation has been vigorously conducted on an ink jet ink using a pigment as a coloring material. However, an image recorded with a pigment ink generally has lower color developability than that of an image recorded with a dye ink using a dye as a coloring material, and hence it has been a subject to achieve both its fastness property and color developability. Particularly in the case of an image to be recorded with an ink having a yellow hue (yellow ink), it has been known that its lightfastness and color developability are in a trade-off relationship. Accordingly, it has been necessary to develop a yellow ink capable of recording an image that simultaneously satisfies lightfastness and color developability.

C.I. Pigment Yellow 74 or 128 has been frequently used heretofore as a yellow pigment to be used in an ink jet ink. However, none of the pigments has been able to achieve both lightfastness and color developability. In view of the foregoing, in recent years, an investigation has been conducted on the use of C.I. Pigment Yellow 213 considered to be excellent in lightfastness as compared with other yellow pigments. For example, there has been a proposal concerning a yellow ink using C.I. Pigment Yellow 213 or 155 as a coloring material, the ink being capable of recording an image improved in lightfastness and color developability (see Japanese Patent Application Laid-Open No. 2008-266568). There has also been a proposal concerning an ink using C.I. Pigment Yellow 213 and another pigment (see Japanese Patent Application Laid-Open No. 2010-001478 and Japanese Patent Application Laid-Open No. 2010-248287).

SUMMARY OF THE INVENTION

An investigation conducted by the inventors of the present invention has found that the lightfastness of an image recorded with the yellow ink proposed in Japanese Patent Application Laid-Open No. 2008-266568 is high as compared with that in the case where C.I. Pigment Yellow 128 or 129 which has been conventionally mainstream is used. However, the ink has not been necessarily able to satisfy a high level of color developability demanded of a yellow ink, the demand starting to grow in recent years. In addition, an image recorded with the ink proposed in Japanese Patent Application Laid-Open No. 2010-001478 has improved resistance against ultraviolet light or water but its color developability has not been perceived as a problem, and hence the ink has also been unable to satisfy the high level of demand. Further, the ink described in Japanese Patent Application Laid-Open No. 2010-001478 has had no suitability for a recording medium having permeability such as plain paper or glossy paper, though the ink is suitable mainly for a non-permeable recording medium. On the other hand, the ink proposed in Japanese Patent Application Laid-Open No. 2010-248287 has been unable to simultaneously satisfy color developability and lightfastness at levels demanded in recent years, though the ink has suitability for a recording medium having permeability.

Therefore, an object of the present invention is to provide an aqueous ink capable of recording an image achieving a high level of both of color developability and lightfastness, and an ink cartridge and an ink jet recording method using the ink.

The object is achieved by the present invention described below. That is, according to the present invention, there is provided an aqueous ink, including a first pigment and a second pigment, in which the first pigment is C.I. Pigment Yellow 213; the second pigment is at least one selected from the group consisting of C.I. Pigment Yellows 93, 128, 138, 151, 155, 180, and 215; a content A (% by mass) of the first pigment and a content B (% by mass) of the second pigment based on a total mass of the ink satisfy a relationship of $0.1 \leq A/(A+B) \leq 0.9$; and the ink further includes a water-soluble organic solvent having an SP value (unit: $(cal/cm^3)^{1/2}$) determined by Fedors' method of 11.0 or more and 16.0 or less.

According to the present invention, there can be provided an aqueous ink capable of recording an image achieving a high level of both of color developability and lightfastness, and an ink cartridge and an ink jet recording method using the ink.

DESCRIPTION OF THE EMBODIMENTS

Hereinafter, the present invention is described in detail by way of an embodiment. It should be noted that the abbreviation "C.I." as used in the description of the specification means "color index." In addition, an aqueous ink is sometimes simply described as "ink." In the present invention, various physical property values are values at 25° C. unless otherwise stated.

An investigation conducted by the inventors of the present invention has found that it is important to use two specific kinds of pigments in combination at a certain ratio, and to incorporate a water-soluble organic solvent having an SP value determined by Fedors' method in a specific numerical range into an ink in order that an image achieving both of color developability and lightfastness may be recorded. Hereinafter, a water-soluble organic solvent having an SP value determined by Fedors' method of 11.0 or more and 16.0 or less is sometimes described as "specific water-soluble organic solvent."

The SP value ($\delta$) (unit: $(cal/cm^3)^{1/2}$) utilized for the specification of the water-soluble organic solvent in the present invention is a value determined by Fedors' method. The SP value is a value also referred to as "solubility parameter," and the affinity of a solute for a solvent tends to be larger as a difference between the SP value of the solute and the SP value of the solvent reduces. Specifically, the SP value ($\delta$) of the water-soluble organic solvent can be calculated from the following equation (1). In the following equation (1), $\Delta E_{vap}$ represents the molar heat of vaporization (cal/mol) of a water-soluble organic solvent and V represents the molar volume ($cm^3$/mol) of the water-soluble organic solvent at 25° C. It should be noted that the molar heat of vaporization ($\Delta E_{vap}$) of the water-soluble organic solvent and the molar volume (V) of the water-soluble organic solvent at 25° C. are each determined by the summation of certain values assigned to an atom or a group in a molecule. Although the SP value is generally expressed with "cal", the relationship "$(cal/cm^3)^{1/2} = 2.046 \times 10^3 (J/m^3)^{1/2}$" is used upon its conversion into an SI unit system. The SP value is a value represented in the unit of (cal/cm³)^(1/2), though the unit of the SP value is sometimes omitted in the following description.

$$\delta = \sqrt{\frac{\Delta E_{vap}}{V}} \quad (1)$$

It has been conventionally known that the color developability of an image obtained with an ink using a specific combination of two or more kinds of yellow pigments can be improved as compared with that in the case where only one kind of yellow pigment is used. An investigation conducted by the inventors of the present invention has found that the use of a first pigment and a second pigment in combination at a specific ratio to be described later brings at least part of a pigment layer into such a state that the layer is capable of contributing to an improvement in color developability. The inventors of the present invention have confirmed that such pigment layer included a portion of a two-layer structure (hereinafter, sometimes described as "pigment layer having a two-layer structure"). In addition, its upper layer contained C.I. Pigment Yellow 213 (first pigment), and its lower layer contained at least one (second pigment) selected from the group consisting of C.I. Pigment Yellows 93, 128, 138, 151, 155, 180, and 215.

The mechanism via which the pigment layer having the two-layer structure is more excellent in color developability than a single-layer pigment layer is assumed to be as described below. First, an ideal image is described. In the case of, for example, a yellow image, upon incidence of light on a pigment layer constituting the image, all light in the wavelength region of a complementary color component for yellow is absorbed and all light in other wavelength regions than such region is reflected, and hence the image is recognized as an ideal yellow image.

When light is incident on the pigment layer having the two-layer structure, first, light in a short wavelength region (light of the complementary color component) is absorbed in the upper layer containing C.I. Pigment Yellow 213 (first pigment) as a pigment having high transparency. The upper layer has high transparency, and hence not all the light of the complementary color component is absorbed but part of the light or all of the light depending on a wavelength region transmits through the upper layer. Next, the light of the complementary color component that has transmitted through the upper layer is absorbed in the lower layer containing the second pigment as a pigment having a wider absorption wavelength region than that of the first pigment in the upper layer. That is, in the case of the pigment layer having the two-layer structure constituted of the first pigment and the second pigment, the absorption characteristics of the respective upper layer and lower layer are reflected. Accordingly, a larger quantity of light of the complementary color component is absorbed in the pigment layer having the two-layer structure than that in the case of the single-layer pigment layer formed of only one kind of pigment, and hence the color developability of the image may be significantly improved.

The first pigment and the second pigment to be incorporated into an ink of the present invention are selected by the foregoing reason. That is, it is extremely important to use the first pigment having high transparency and the second pigment having the following characteristics in combination. In the reflection spectrum of a pigment layer formed with an ink using only the second pigment as a coloring material, the second pigment has a maximum of the reflection spectrum in a longer wavelength region than the first pigment. By such reasons, C.I. Pigment Yellow 213 needs to be used as the first pigment, and at least one selected from the group consisting of C.I. Pigment Yellows 93, 128, 138, 151, 155, 180, and 215 needs to be used as the second pigment.

Further, in the present invention, the content A (% by mass) of the first pigment and the content B (% by mass) of the second pigment based on the total mass of the ink need to satisfy the relationship of $0.1 \le A/(A+B) \le 0.9$. When the value $A/(A+B)$ is less than 0.1, the ratio of the pigment layer of the two-layer structure in the recorded image reduces. Accordingly, the color developability of the image becomes insufficient depending on the kind of the second pigment, and the lightfastness of the image also becomes insufficient because the amount of the first pigment is small. On the other hand, when the value $A/(A+B)$ is more than 0.9, the lightfastness of the image is improved but the portion of the pigment layer of the two-layer structure in the image becomes small. Accordingly, the color developability of the image becomes insufficient.

A further investigation conducted by the inventors of the present invention has found that an ink capable of recording an image improved not only in color developability but also in lightfastness is obtained by further incorporating a water-soluble organic solvent having an SP value of 11.0 or more and 16.0 or less into the ink. The mechanism via which not only the color developability of the image but also its lightfastness is improved with the ink further containing the specific water-soluble organic solvent in addition to the first pigment and the second pigment is assumed to be as described below.

Even when the first and second pigments are merely used in combination at a predetermined ratio, at least part of a pigment layer to be formed is of a two-layer structure. Accordingly, the color developability is improved to some degree as described in the foregoing. However, from the viewpoints of additionally improving the color developability and improving the lightfastness as well, a pigment layer including a larger amount of such a portion that the upper layer containing the first pigment and the lower layer containing the second pigment are clearly separated from each other is preferably formed. In addition, the inventors of the present invention have found that a clear difference arises between the affinity of the water-soluble organic solvent having an SP value of 11.0 or more and 16.0 or less for the first pigment and its affinity for the second pigment.

Assumed here is the case where an image is recorded on a recording medium with an ink containing a specific water-soluble organic solvent, a first pigment having a low affinity for the water-soluble organic solvent, and a second pigment having a high affinity for the water-soluble organic solvent. When the ink is applied to the recording medium, the concentration of the specific water-soluble organic solvent relatively increases in association with the vaporization of water in the ink. As a result, the first pigment weakly aggregates at a time point earlier than the second pigment does because of its low affinity for the specific water-soluble organic solvent. During the foregoing, the ink permeates a recording medium. However, the second pigment having a high affinity for the specific water-soluble organic solvent hardly aggregates as compared with the first pigment and is hence drawn by the permeation of the ink into the recording medium to fix at a position lower than that of the first pigment. As a result, a pigment layer including a larger amount of such a portion that the pigments are clearly separated into two layers is easily formed, and hence an image more excellent in color developability can be recorded. Further, excellent lightfastness is maintained because the first pigment excellent in lightfastness is present in a large amount in the upper layer.

The use of the specific water-soluble organic solvent (water-soluble organic solvent having an SP value of 11.0 or more and 16.0 or less) causes the above-mentioned mechanism even when another water-soluble organic solvent than the foregoing (water-soluble organic solvent having an SP value of less than 11.0 or more than 16.0) is present, and hence an effect of the present invention can be obtained. On the other hand, when only a water-soluble organic solvent other than the specific water-soluble organic solvent is used, a significant difference between the affinity of the first pigment for the other water-soluble organic solvent and the affinity of the second pigment therefor hardly arises. Accordingly, an image excellent in color developability and lightfastness can no longer be recorded.

Aqueous Ink

Hereinafter, a component constituting the aqueous ink of the present invention and the like are described in detail.

Pigments

The ink of the present invention contains the first pigment and the second pigment. In addition, the first pigment is C.I. Pigment Yellow 213. In addition, the second pigment is at least one selected from the group consisting of C.I. Pigment Yellows 93, 128, 138, 151, 155, 180, and 215. The content (% by mass) of the first pigment in the ink is preferably 0.05% by mass or more and 10.0% by mass or less based on the total mass of the ink. The content (% by mass) of the second pigment in the ink is preferably 0.05% by mass or more and 10.0% by mass or less based on the total mass of the ink. In addition, the total content (% by mass) of the pigments in the ink is preferably 0.1% by mass or more and 15.0% by mass or less based on the total mass of the ink.

As described above, in the ink of the present invention, the content A (% by mass) of the first pigment and the content B (% by mass) of the second pigment based on the total mass of the ink need to satisfy the relationship of $0.1 \leq A/(A+B) \leq 0.9$. In addition, it is more preferable to satisfy the relationship $0.2 \leq A/(A+B) \leq 0.7$. When the value $A/(A+B)$ is less than 0.1 (the amount of the first pigment is excessively small as compared with that of the second pigment), at least the lightfastness of an image becomes insufficient. On the other hand, when the value $A/(A+B)$ is more than 0.9 (the amount of the first pigment is excessively large as compared with that of the second pigment), the color developability of the image becomes insufficient.

A mode of dispersing pigments can be, for example, a resin-dispersed pigment using a resin as a dispersant or a self-dispersed pigment obtained by introducing a hydrophilic group to the surface of a pigment particle. Further, a resin-bonded, self-dispersed pigment obtained by chemically bonding an organic group containing a polymer to the surface of a pigment particle and a microcapsule pigment obtained by covering at least part of the surface of a pigment particle with a resin or the like can be given as examples of the mode. Of those, a mode involving causing a resin as a dispersant to physically adsorb to the surface of a pigment particle and dispersing the pigment particle by means of the action of the resin is preferably utilized. The resin dispersant is preferably capable of dispersing pigments in an aqueous medium by means of the action of an anionic group or a nonionic group. A conventionally known copolymer that can be used in an ink jet ink or a salt thereof can be used as the resin dispersant. A more suitable resin dispersant is, for example, a copolymer having such a hydrophilic unit and a hydrophobic unit as listed below. The hydrophilic unit is, for example, a unit derived from a hydrophilic monomer such as a monomer having a carboxy group such as (meth)acrylic acid or a salt thereof. In addition, the hydrophobic unit is, for example, a unit derived from a hydrophobic monomer such as styrene and a derivative thereof; a monomer having an aromatic ring such as benzyl (meth)acrylate; or a monomer having an aliphatic group such as a (meth)acrylate. It should be noted that in such a process that the ink is applied to a recording medium to permeate the medium, a direct influence of the resin dispersant on the timing at which the pigments aggregate is extremely small as compared with that of the water-soluble organic solvent. Accordingly, in the present invention, the resin dispersant is not included in the "water-soluble organic solvent" and is not regarded as an object whose SP value is to be calculated.

Water-soluble organic solvent having SP value of 11.0 or more and 16.0 or less

The ink of the present invention contains a water-soluble organic solvent having an SP value (unit: $(cal/cm^3)^{1/2}$) determined by Fedors' method of 11.0 or more and 16.0 or less (specific water-soluble organic solvent). It should be noted that the term "water-soluble organic solvent" as used herein refers to an organic compound that is compatible with water at an arbitrary ratio as long as its amount is smaller than that of water, and includes a solvent that is a solid at normal temperature (25° C.). One kind of the specific water-soluble organic solvents can be used alone, or two or more kinds thereof can be used in combination. There is a clear difference between the affinities of the specific water-soluble organic solvent for the first pigment and the second pigment to be incorporated into the ink of the present invention. As a result, a difference arises between the timing at which the first pigment aggregates and the timing at which the second pigment aggregates, and hence an image achieving both color developability and lightfastness can be recorded. The content (% by mass) of the water-soluble organic solvent having an SP value of 11.0 or more and 16.0 or less in the ink is preferably 1.0% by mass or more and 50.0% by mass or less, more preferably 3.0% by mass or more and 45.0% by mass or less, particularly preferably 3.0% by mass or more and 30.0% by mass or less based on the total mass of the ink.

Specific examples of the water-soluble organic solvent having an SP value (unit: $(cal/cm^3)^{1/2}$) of 11.0 or more and 16.0 or less can include monohydric alcohols having 1 to 4 carbon atoms such as methanol (13.8), ethanol (12.6), n-propanol (11.8), 2-propanol (11.6), n-butanol (11.3), 2-methyl-1-propanol (11.1), and 2-butanol (11.1); amides such as formamide (13.7) and N,N-dimethylformamide (11.6); ketoalcohols and ketons such as 2-methyl-2-hydroxypentan-4-on (11.7); (poly)alkylene glycols such as diethylene glycol (15.0), triethylene glycol (13.6), tetraethylene glycol (12.8), and propylene glycol (15.1); polyhydric alcohols such as 1,3-butanediol (14.8), 1,4-butanediol (15.0), 1,5-pentanediol (14.2), 1,2-hexanediol (13.4), 1,6-hexanediol (13.5), 2-methyl-1,3-propanediol (14.8), 1,2,6-hexanetriol (16.0), and tri-methylolpropane (15.9); glycol ethers such as ethylene glycol monomethyl ether (12.0), ethylene glycol monoethyl ether (11.5), and diethylene glycol monomethyl ether (11.2); urea derivatives such as urea (14.4) and ethylene urea (12.6); and nitrogen-containing compounds such as 2-pyrrolidone (11.2), provided that the numerical value in the parentheses represents the SP value of the corresponding solvent. In the present invention, at least one kind of such solvent that has a lower vapor pressure than water at normal temperature (25° C.) is more preferably used as the specific water-soluble organic solvent.

Of those, at least one selected from the group consisting of alkanediols having 3 to 8 carbon atoms, ethylene urea, 2-pyrrolidone, and polyethylene glycols having 2 to 8 carbon atoms is more preferably used as the specific water-soluble organic solvent. In addition, the alkanediols having 3 to 8 carbon atoms are particularly preferably 1,2-alkanediols and α,ω-alkanediols (alkanediols having hydroxy groups at both terminals of its carbon main chain). The use of any such specific water-soluble organic solvent enables the recording of an image achieving both more excellent color developability and more excellent lightfastness. A possible reason why the use of any such specific water-soluble organic solvent improves the effect is that the difference between the timing at which the first pigment aggregates and the timing at which the second pigment aggregates is more easily caused by an influence of, for example, the steric structure of a molecule of the solvent.

In the present invention, the content A (% by mass) of the first pigment, the content B (% by mass) of the second pigment, and the content S (% by mass) of the specific water-soluble organic solvent based on the total mass of the ink preferably satisfy the relationship of $1.0 \leq S/(A+B) \leq 10.0$. Further, the contents more preferably satisfy the relationship of $1.0 \leq S/(A+B) \leq 5.0$. When the value $S/(A+B)$ is less than 1.0, the difference between the timing at which the first pigment aggregates and the timing at which the second pigment aggregates caused by the water-soluble organic solvent tends to be small. Accordingly, a pigment layer including a larger amount of such a portion that the pigments are clearly separated into two layers is hardly formed, and hence the effect by which the color developability and lightfastness of an image are further improved is hardly obtained to a sufficient degree in some cases. On the other hand, when the value $S/(A+B)$ is more than 10.0, the first pigment tends to excessively aggregate. Accordingly, a pigment layer formed becomes non-dense, that is, a large number of voids are present in the pigment layer. As a result, the quantity of internal scattered light is apt to increase and hence the color developability of the image reduces to some degree in some cases. Further, the area of pigments exposed to light increases and hence the lightfastness of the image reduces to some degree in some cases.

When the water-soluble organic solvent in the ink is only a water-soluble organic solvent whose SP value is more than 16.0, each of the affinity of the first pigment for the water-soluble organic solvent and the affinity of the second pigment therefor increases. Accordingly, the color developability and lightfastness of an image to be recorded become insufficient. Glycerin (20.0), ethylene glycol (17.8), and 1,3-propanediol (16.1) can be given as specific examples of the water-soluble organic solvent whose SP value is more than 16.0, where the numerical value in the parentheses represents the SP value of the corresponding solvent.

On the other hand, when the water-soluble organic solvent in the ink is only a water-soluble organic solvent whose SP value is less than 11.0, each of the affinity of the first pigment for the water-soluble organic solvent and the affinity of the second pigment therefor reduces. Accordingly, the color developability and lightfastness of an image to be recorded become insufficient. Specific examples of the water-soluble organic solvent whose SP value is less than 11.0 can include 2-methyl-2-propanol (10.9), diethylene glycol monoethyl ether (10.9), 1,3-dimethyl-2-imidazolidinone (10.8), N,N-dimethyl acetamide (10.6), triethylene glycol monoethyl ether (10.6), γ-butyrolactone (10.5), triethylene glycol monobutyl ether (10.3), a polyethylene glycol having a number-average molecular weight of 1,000 (10.1), N-methyl-2-pyrrolidone (10.1), acetone (9.1), N-methylmorpholine (9.1), methylethyl ketone (9.0), tetrahydrofuran (7.3), dioxane (8.6), tetraethylene glycol dimethyl ether (8.6), and diethylene glycol diethyl ether (8.2), where the numerical value in the parentheses represents the SP value of the corresponding solvent.

Aqueous Medium

The ink of the present invention is an aqueous ink containing at least water as an aqueous medium. The specific water-soluble organic solvent as well as water is included in the aqueous medium. Deionized water is preferably used as water. The water content (% by mass) in the ink is preferably 40.0% by mass or more and 95.0% by mass or less, more preferably 50.0% by mass or more and 95.0% by mass or less based on the total mass of the ink. In addition, in the ink of the present invention, one water-soluble organic solvent having an SP value of less than 11.0 or more than 16.0 can further be used alone, or two or more kinds thereof can further be used in combination. Particularly in the case where the ink of the present invention is used for ink jet recording, at least a water-soluble organic solvent having an SP value of more than 16.0 such as glycerin is preferably incorporated for imparting moisture retentivity to the ink to improve its ejection characteristics.

The content (% by mass) of water-soluble organic solvents in the ink is preferably 1.0% by mass or more and 50.0% by mass or less, more preferably 3.0% by mass or more and 50.0% by mass or less based on the total mass of the ink. It should be noted that the term "content of water-soluble organic solvents" in this case means the sum of the content of the water-soluble organic solvent having an SP value of 11.0 or more and 16.0 or less and the content of an additional water-soluble organic solvent having an SP value of less than 11.0 or of more than 16.0, when such additional solvent is used. In addition, the ratio (% by mass) of the content of the water-soluble organic solvent having an SP value of 11.0 or more and 16.0 or less to the total content of all the water-soluble organic solvents in the ink is preferably 5.0% by mass or more and 100.0% by mass or less, more preferably 20.0% by mass or more and 90.0% by mass or less, particularly preferably 40.0% by mass or more and 80.0% by mass or less.

Other Components

The ink of the present invention may contain various additives as required. A surfactant, a pH adjustor, a defoaming agent, a rust inhibitor, an antiseptic, a mildewproofing agent, an antioxidant, a reduction inhibitor, an evaporation accelerator, and a chelating agent can be given as examples of such additives. It should be noted that in general, the content of these additives in the ink is considerably small and hence its direct influence on the timing at which each pigment aggregates is also small. Accordingly, in the present invention, such additive is not included in the "water-soluble organic solvent" and is not regarded as an object whose SP value is to be calculated.

A polyoxyethylene alkyl ether is preferably further incorporated as a surfactant into the ink of the present invention. It should be noted that the term "surfactant" as used herein means a compound which has such nature as to be capable of reducing an interfacial tension between two immiscible layers by molecular alignment at the interface and of forming a micelle and has a hydrophilic group and a hydrophobic group in localized states in a molecule thereof. The polyoxyethylene alkyl ether has such an action as to reduce to some degree the permeation rate of the ink into a recording medium. Accordingly, the incorporation of the polyoxyethylene alkyl ether into the ink secures a sufficient time for the first pigment to weakly aggregate by virtue of the action of the specific water-soluble organic solvent after the application of the ink to the recording medium. As a result, an image having more excellent lightfastness and more excellent color developability can be recorded.

The polyoxyethylene alkyl ether has a structure represented by a general formula "R—O—(CH$_2$CH$_2$O)$_m$H." In the general formula, R represents a hydrocarbon group and m represents an integer. The number of carbon atoms of R (hydrocarbon group) in the general formula, which is a hydrophobic group of the polyoxyethylene alkyl ether to be incorporated into the ink of the present invention, is preferably 12 to 22. More specifically, R in the general formula preferably represents a lauryl group (12), a cetyl group (16), a stearyl group (18), an oleyl group (18), a behenyl group (22), or the like (the numerical value in the parentheses represents the number of carbon atoms of the hydrocarbon group). In addition, m in the general formula representing the number of ethylene oxide groups, which is a hydrophilic group of the polyoxyethylene alkyl ether, preferably represents 10 or more and 50 or less.

The content (% by mass) of the polyoxyethylene alkyl ether in the ink is preferably 0.05% by mass or more and 5.0% by mass or less based on the total mass of the ink. When the content is less than 0.05% by mass, the content is so small that an effect of the addition of the polyoxyethylene alkyl ether is not sufficiently exerted in some cases. On the other hand, when the content is more than 5.0% by mass, the first pigment tends to excessively aggregate. As a result, the inside of a pigment layer becomes non-dense, and hence the color developability and lightfastness of an image reduce to some degree in some cases.

Ink Cartridge

An ink cartridge of the present invention is provided with an ink and an ink storage portion for storing the ink. In addition, the ink stored in the ink storage portion is the ink of the present invention described in the foregoing. The structure of the ink cartridge is, for example, such that the ink storage portion is constituted of an ink storage chamber for storing a liquid ink and a negative-pressure-generating member storage chamber for storing a negative-pressure-generating member for holding the ink in itself with a negative pressure. Alternatively, the ink cartridge may be such that the ink storage portion does not have an ink storage chamber for storing a liquid ink and is constituted so as to hold the total amount to be stored with the negative-pressure-generating member. Further, the ink cartridge may be constituted so as to have the ink storage portion and a recording head.

Ink Jet Recording Method

An ink jet recording method of the present invention is a method including ejecting the ink of the present invention described in the foregoing from an ink jet recording head to record an image on a recording medium. A mode of ejecting the ink is, for example, a mode involving applying a mechanical energy to the ink or a mode involving applying a thermal energy to the ink. The process of the ink jet recording method may be known ones except that the ink of the present invention is used. For example, paper having permeability such as plain paper and a recording medium having a coating layer (e.g., glossy paper or art paper) is preferably used as the recording medium.

EXAMPLES

Hereinafter, the present invention is described more specifically by way of examples and comparative examples. However, the present invention is by no means limited by the following examples unless going beyond the gist thereof. It should be noted that the terms "part(s)" and "%" each used for describing the usage of a component refer to "part(s) by mass" and "% by mass," respectively unless otherwise stated.

Preparation of Pigment Dispersion Liquids

The respective components (unit: part(s)) shown in the upper part of Table 1 were mixed and dispersed with a batch-type, vertical sand mill (manufactured by AIMEX Corporation) for 3 hours. After that, coarse particles were removed by a centrifugation treatment. It should be noted that an aqueous solution having a resin (solid matter) content of 20.0%, which was obtained by neutralizing a styrene-acrylic acid copolymer (resin dispersant) having an acid value of 210 mgKOH/g and a weight-average molecular weight of 8,000 with a 10% aqueous solution of sodium hydroxide, was used as a "resin aqueous solution." The lower part of Table 1 shows the contents of pigments and resins in the resultant pigment dispersion liquids.

TABLE 1

Compositions and characteristics of pigment dispersion liquids

| | Kind of pigment dispersion liquid | | | | | | | | | | |
|---|---|---|---|---|---|---|---|---|---|---|---|
| | 1 | 2 | 3 | 4 | 5 | 6 | 7 | 8 | 9 | 10 | 11 |
| C.I. Pigment Yellow 213 | 10.0 | | | | | | | | | | |
| C.I. Pigment Yellow 93 | | 10.0 | | | | | | | | | |
| C.I. Pigment Yellow 128 | | | 10.0 | | | | | | | | |
| C.I. Pigment Yellow 138 | | | | 10.0 | | | | | | | |
| C.I. Pigment Yellow 151 | | | | | 10.0 | | | | | | |
| C.I. Pigment Yellow 155 | | | | | | 10.0 | | | | | |
| C.I. Pigment Yellow 180 | | | | | | | 10.0 | | | | |
| C.I. Pigment Yellow 215 | | | | | | | | 10.0 | | | |
| C.I. Pigment Yellow 74 | | | | | | | | | 10.0 | | |
| C.I. Pigment Yellow 129 | | | | | | | | | | 10.0 | |
| C.I. Pigment Yellow 185 | | | | | | | | | | | 10.0 |
| Resin aqueous solution | 50.0 | 50.0 | 50.0 | 50.0 | 50.0 | 50.0 | 50.0 | 50.0 | 50.0 | 50.0 | 50.0 |
| Water | 40.0 | 40.0 | 40.0 | 40.0 | 40.0 | 40.0 | 40.0 | 40.0 | 40.0 | 40.0 | 40.0 |
| Content of pigment (%) | 10.0 | 10.0 | 10.0 | 10.0 | 10.0 | 10.0 | 10.0 | 10.0 | 10.0 | 10.0 | 10.0 |
| Content of resin (%) | 10.0 | 10.0 | 10.0 | 10.0 | 10.0 | 10.0 | 10.0 | 10.0 | 10.0 | 10.0 | 10.0 |

Preparation of Inks (Examples 1 to 30 and Comparative Examples 1 to 22)

The respective components (unit: %) shown in the upper part of Tables 2-1 to 2-5 were mixed and sufficiently stirred. After that, the mixture was filtered under pressure through a cellulose acetate filter having a pore size of 0.8 μm (manufactured by ADVANTEC Co.). Thus, inks (Examples 1 to 30 and Comparative Examples 1 to 22) were prepared. It should be noted that the numerical value in the parentheses attached to each water-soluble organic solvent in Tables 2-1 to 2-5 is an SP value (unit: $(cal/cm^3)^{1/2}$) determined by Fedors' method. In addition, in the lower part of Tables 2-1 to 2-5, the value A/(A+B) calculated from the content A (%) of a first pigment and the content B (%) of a second pigment is shown. Further, the value S/(A+B) calculated from the content A (%) of the first pigment, the content B (%) of the second pigment, and the content S (%) of a specific water-soluble organic solvent is also shown. In addition, details about trade names in Tables 2-1 to 2-5 are described below.

"Solsperse 32000" (manufactured by Lubrizol Corporation): resin dispersant

"PARALOID B-60" (manufactured by Rohm and Haas Company): acrylic binder resin

"NIKKOL BC-20" (manufactured by Nikko Chemicals Co., Ltd.): polyoxyethylene cetyl ether (surfactant, number of carbon atoms in hydrocarbon group: 16, moles of added ethyleneoxide groups: 20)

"NIKKOL BO-50" (manufactured by Nikko Chemicals Co., Ltd.): polyoxyethylene oleyl ether (surfactant, number of carbon atoms in hydrocarbon group: 18, moles of added ethyleneoxide groups: 50)

"Acetylenol E100" (manufactured by Kawaken Fine Chemicals Co., Ltd.): ethyleneoxide adduct of the acetylenic glycol (surfactant)

TABLE 2-1

Compositions and characteristics of inks

| | Example | | | | | | | | | |
|---|---|---|---|---|---|---|---|---|---|---|
| | 1 | 2 | 3 | 4 | 5 | 6 | 7 | 8 | 9 | 10 |
| Pigment dispersion liquid 1 | 20.0 | 20.0 | 20.0 | 20.0 | 20.0 | 20.0 | 20.0 | 4.0 | 8.0 | 28.0 |
| Pigment dispersion liquid 2 | 20.0 | | | | | | | | | |
| Pigment dispersion liquid 3 | | 20.0 | | | | | | | | |
| Pigment dispersion liquid 4 | | | 20.0 | | | | | | | |
| Pigment dispersion liquid 5 | | | | 20.0 | | | | | | |
| Pigment dispersion liquid 6 | | | | | 20.0 | | | 36.0 | 32.0 | 12.0 |
| Pigment dispersion liquid 7 | | | | | | 20.0 | | | | |
| Pigment dispersion liquid 8 | | | | | | | 20.0 | | | |
| Pigment dispersion liquid 9 | | | | | | | | | | |
| Pigment dispersion liquid 10 | | | | | | | | | | |
| Pigment dispersion liquid 11 | | | | | | | | | | |
| C.I. Pigment Yellow 213 | | | | | | | | | | |
| C.I. Pigment Yellow 110 | | | | | | | | | | |
| Solsperse 32000 | | | | | | | | | | |
| PARALOID B-60 | | | | | | | | | | |
| Glycerin (20.0) | 5.0 | 5.0 | 5.0 | 5.0 | 5.0 | 5.0 | 5.0 | 5.0 | 5.0 | 5.0 |
| Ethylene glycol (17.8) | | | | | | | | | | |
| 1,3-Propanediol (16.1) | | | | | | | | | | |
| 1,2,6-Hexanetriol (16.0) | | | | | | | | | | |
| Triethylene glycol (13.6) | 5.0 | 5.0 | 5.0 | 5.0 | 5.0 | 5.0 | 5.0 | 5.0 | 5.0 | 5.0 |
| 1,6-Hexanediol (13.5) | | | | | | | | | | |
| 1,2-Hexanediol (13.4) | 5.0 | 5.0 | 5.0 | 5.0 | 5.0 | 5.0 | 5.0 | 5.0 | 5.0 | 5.0 |
| Ethylene urea (12.6) | 5.0 | 5.0 | 5.0 | 5.0 | 5.0 | 5.0 | 5.0 | 5.0 | 5.0 | 5.0 |
| 2-Pyrrolidone (11.2) | 5.0 | 5.0 | 5.0 | 5.0 | 5.0 | 5.0 | 5.0 | 5.0 | 5.0 | 5.0 |
| γ-Butyrolactone (10.5) | | | | | | | | | | |
| Triethylene glycol monobutyl ether (10.3) | | | | | | | | | | |
| Polyethylene glycol 1,000(10.1) | | | | | | | | | | |
| N-Methyl-2-pyrrolidone (10.1) | | | | | | | | | | |
| Tetraethylene glycol dimethyl ether (8.6) | | | | | | | | | | |
| Diethylene glycol diethyl ether (8.2) | | | | | | | | | | |
| NIKKOL BC-20 | 0.5 | 0.5 | 0.5 | 0.5 | 0.5 | 0.5 | 0.5 | 0.5 | 0.5 | 0.5 |
| NIKKOL BO-50 | | | | | | | | | | |
| Acetylenol E100 | 0.2 | 0.2 | 0.2 | 0.2 | 0.2 | 0.2 | 0.2 | 0.2 | 0.2 | 0.2 |
| Ion-exchanged water | 34.3 | 34.3 | 34.3 | 34.3 | 34.3 | 34.3 | 34.3 | 34.3 | 34.3 | 34.3 |
| Content A | 2.0 | 2.0 | 2.0 | 2.0 | 2.0 | 2.0 | 2.0 | 0.4 | 0.8 | 2.8 |
| Content B | 2.0 | 2.0 | 2.0 | 2.0 | 2.0 | 2.0 | 2.0 | 3.6 | 3.2 | 1.2 |
| Content S | 20.0 | 20.0 | 20.0 | 20.0 | 20.0 | 20.0 | 20.0 | 20.0 | 20.0 | 20.0 |
| A/(A + B) | 0.5 | 0.5 | 0.5 | 0.5 | 0.5 | 0.5 | 0.5 | 0.1 | 0.2 | 0.7 |
| S/(A + B) | 5.0 | 5.0 | 5.0 | 5.0 | 5.0 | 5.0 | 5.0 | 5.0 | 5.0 | 5.0 |

TABLE 2-2

Compositions and characteristics of inks

| | Example | | | | | | | | | |
|---|---|---|---|---|---|---|---|---|---|---|
| | 11 | 12 | 13 | 14 | 15 | 16 | 17 | 18 | 19 | 20 |
| Pigment dispersion liquid 1 | 30.0 | 36.0 | 20.0 | 20.0 | 20.0 | 20.0 | 20.0 | 20.0 | 20.0 | 20.0 |
| Pigment dispersion liquid 2 | | | | | | | | | | |
| Pigment dispersion liquid 3 | | | | | | | | | | |

TABLE 2-2-continued

Compositions and characteristics of inks

| | Example | | | | | | | | | |
|---|---|---|---|---|---|---|---|---|---|---|
| | 11 | 12 | 13 | 14 | 15 | 16 | 17 | 18 | 19 | 20 |
| Pigment dispersion liquid 4 | | | | | | | | | | |
| Pigment dispersion liquid 5 | | | | | | | | | | |
| Pigment dispersion liquid 6 | 10.0 | 4.0 | 20.0 | 20.0 | 20.0 | 20.0 | 20.0 | 20.0 | 20.0 | 20.0 |
| Pigment dispersion liquid 7 | | | | | | | | | | |
| Pigment dispersion liquid 8 | | | | | | | | | | |
| Pigment dispersion liquid 9 | | | | | | | | | | |
| Pigment dispersion liquid 10 | | | | | | | | | | |
| Pigment dispersion liquid 11 | | | | | | | | | | |
| C.I. Pigment Yellow 213 | | | | | | | | | | |
| C.I. Pigment Yellow 110 | | | | | | | | | | |
| Solsperse 32000 | | | | | | | | | | |
| PARALOID B-60 | | | | | | | | | | |
| Glycerin (20.0) | 5.0 | 5.0 | 5.0 | 5.0 | 5.0 | 5.0 | 5.0 | 5.0 | 5.0 | 5.0 |
| Ethylene glycol (17.8) | | | | | | | | | | |
| 1,3-Propanediol (16.1) | | | | | | | | | | |
| 1,2,6-Hexanetriol (16.0) | | | 5.0 | | | | | | | |
| Triethylene glycol (13.6) | 5.0 | 5.0 | | 5.0 | | | | | 5.0 | 5.0 |
| 1,6-Hexanediol (13.5) | | | | | 5.0 | | | | | |
| 1,2-Hexanediol (13.4) | 5.0 | 5.0 | | | | 5.0 | | | 5.0 | 5.0 |
| Ethylene urea (12.6) | 5.0 | 5.0 | | | | | 5.0 | | 5.0 | 5.0 |
| 2-Pyrrolidone (11.2) | 5.0 | 5.0 | | | | | | 5.0 | 5.0 | 5.0 |
| γ-Butyrolactone (10.5) | | | | | | | | | | |
| Triethylene glycol monobutyl ether (10.3) | | | | | | | | | 5.0 | |
| Polyethylene glycol 1,000 (10.1) | | | | | | | | | | 5.0 |
| N-Methyl-2-pyrrolidone (10.1) | | | | | | | | | | |
| Tetraethylene glycol dimethyl ether (8.6) | | | | | | | | | | |
| Diethylene glycol diethyl ether (8.2) | | | | | | | | | | |
| NIKKOL BC-20 | 0.5 | 0.5 | 0.5 | 0.5 | 0.5 | 0.5 | 0.5 | 0.5 | 0.5 | 0.5 |
| NIKKOL BO-50 | | | | | | | | | | |
| Acetylenol E100 | 0.2 | 0.2 | 0.2 | 0.2 | 0.2 | 0.2 | 0.2 | 0.2 | 0.2 | 0.2 |
| Ion-exchanged water | 34.3 | 34.3 | 49.3 | 49.3 | 49.3 | 49.3 | 49.3 | 49.3 | 29.3 | 29.3 |
| Content A | 3.0 | 3.6 | 2.0 | 2.0 | 2.0 | 2.0 | 2.0 | 2.0 | 2.0 | 2.0 |
| Content B | 1.0 | 0.4 | 2.0 | 2.0 | 2.0 | 2.0 | 2.0 | 2.0 | 2.0 | 2.0 |
| Content S | 20.0 | 20.0 | 5.0 | 5.0 | 5.0 | 5.0 | 5.0 | 5.0 | 20.0 | 20.0 |
| A/(A + B) | 0.8 | 0.9 | 0.5 | 0.5 | 0.5 | 0.5 | 0.5 | 0.5 | 0.5 | 0.5 |
| S/(A + B) | 5.0 | 5.0 | 1.3 | 1.3 | 1.3 | 1.3 | 1.3 | 1.3 | 5.0 | 5.0 |

TABLE 2-3

Compositions and characteristics of inks

| | Example | | | | | | | | | |
|---|---|---|---|---|---|---|---|---|---|---|
| | 21 | 22 | 23 | 24 | 25 | 26 | 27 | 28 | 29 | 30 |
| Pigment dispersion liquid 1 | 20.0 | 20.0 | 20.0 | 20.0 | 20.0 | 20.0 | 20.0 | 20.0 | 20.0 | 4.0 |
| Pigment dispersion liquid 2 | | | | | | | | | | |
| Pigment dispersion liquid 3 | | | | | | | | | | |
| Pigment dispersion liquid 4 | | | | | | | | | | |
| Pigment dispersion liquid 5 | | | | | | | | | | |
| Pigment dispersion liquid 6 | 20.0 | 20.0 | 20.0 | 20.0 | 20.0 | 20.0 | 20.0 | 20.0 | 20.0 | 36.0 |
| Pigment dispersion liquid 7 | | | | | | | | | | |
| Pigment dispersion liquid 8 | | | | | | | | | | |
| Pigment dispersion liquid 9 | | | | | | | | | | |
| Pigment dispersion liquid 10 | | | | | | | | | | |
| Pigment dispersion liquid 11 | | | | | | | | | | |
| C.I. Pigment Yellow 213 | | | | | | | | | | |
| C.I. Pigment Yellow 110 | | | | | | | | | | |
| Solsperse 32000 | | | | | | | | | | |
| PARALOID B-60 | | | | | | | | | | |
| Glycerin (20.0) | 5.0 | 5.0 | 5.0 | 5.0 | 5.0 | 5.0 | 5.0 | 5.0 | 5.0 | 5.0 |
| Ethylene glycol (17.8) | | | | | | | | | | |
| 1,3-Propanediol (16.1) | | | | | | | | | | |
| 1,2,6-Hexanetriol (16.0) | | | | | | | | | | |
| Triethylene glycol (13.6) | 0.9 | 1.0 | 10.0 | 12.0 | 5.0 | 5.0 | 5.0 | 5.0 | 5.0 | |
| 1,6-Hexanediol (13.5) | | | | | | | | | | 3.0 |
| 1,2-Hexanediol (13.4) | 0.9 | 1.0 | 10.0 | 10.0 | 5.0 | 5.0 | 5.0 | 5.0 | 5.0 | |
| Ethylene urea (12.6) | 0.9 | 1.0 | 10.0 | 10.0 | 5.0 | 5.0 | 5.0 | 5.0 | 5.0 | |
| 2-Pyrrolidone (11.2) | 0.9 | 1.0 | 10.0 | 10.0 | 5.0 | 5.0 | 5.0 | 5.0 | 5.0 | |

TABLE 2-3-continued

Compositions and characteristics of inks

| | Example | | | | | | | | | |
|---|---|---|---|---|---|---|---|---|---|---|
| | 21 | 22 | 23 | 24 | 25 | 26 | 27 | 28 | 29 | 30 |
| γ-Butyrolactone (10.5) | | | | | | | | | | |
| Triethylene glycol monobutyl ether (10.3) | | | | | | | | | | |
| Polyethylene glycol 1,000 (10.1) | | | | | | | | | | |
| N-Methyl-2-pyrrolidone (10.1) | | | | | | | | | | |
| Tetraethylene glycol dimethyl ether (8.6) | | | | | | | | | | |
| Diethylene glycol diethyl ether (8.2) | | | | | | | | | | |
| NIKKOL BC-20 | 0.5 | 0.5 | 0.5 | 0.5 | | | 0.1 | 5.0 | 6.0 | |
| NIKKOL BO-50 | | | | | | 0.5 | | | | |
| Acetylenol E100 | 0.2 | 0.2 | 0.2 | 0.2 | 0.2 | 0.2 | 0.2 | 0.2 | 0.2 | 0.2 |
| Ion-exchanged water | 50.7 | 50.3 | 14.3 | 12.3 | 34.8 | 34.3 | 34.8 | 29.8 | 28.8 | 51.8 |
| Content A | 2.0 | 2.0 | 2.0 | 2.0 | 2.0 | 2.0 | 2.0 | 2.0 | 2.0 | 0.4 |
| Content B | 2.0 | 2.0 | 2.0 | 2.0 | 2.0 | 2.0 | 2.0 | 2.0 | 2.0 | 3.6 |
| Content S | 3.6 | 4.0 | 40.0 | 42.0 | 20.0 | 20.0 | 20.0 | 20.0 | 20.0 | 3.0 |
| A/(A + B) | 0.5 | 0.5 | 0.5 | 0.5 | 0.5 | 0.5 | 0.5 | 0.5 | 0.5 | 0.1 |
| S/(A + B) | 0.9 | 1.0 | 10.0 | 10.5 | 5.0 | 5.0 | 5.0 | 5.0 | 5.0 | 0.8 |

TABLE 2-4

Compositions and characteristics of inks

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid 1 | 40.0 | | | | | | | | | | |
| Pigment dispersion liquid 2 | | 40.0 | | | | | | | | | |
| Pigment dispersion liquid 3 | | | 40.0 | | | | | | | | |
| Pigment dispersion liquid 4 | | | | 40.0 | | | | | | | |
| Pigment dispersion liquid 5 | | | | | 40.0 | | | | | | |
| Pigment dispersion liquid 6 | | | | | | 40.0 | | | | | |
| Pigment dispersion liquid 7 | | | | | | | 40.0 | | | | |
| Pigment dispersion liquid 8 | | | | | | | | 40.0 | | | |
| Pigment dispersion liquid 9 | | | | | | | | | 40.0 | | |
| Pigment dispersion liquid 10 | | | | | | | | | | 40.0 | |
| Pigment dispersion liquid 11 | | | | | | | | | | | 40.0 |
| C.I. Pigment Yellow 213 | | | | | | | | | | | |
| C.I. Pigment Yellow 110 | | | | | | | | | | | |
| Solsperse 32000 | | | | | | | | | | | |
| PARALOID B-60 | | | | | | | | | | | |
| Glycerin (20.0) | 5.0 | 5.0 | 5.0 | 5.0 | 5.0 | 5.0 | 5.0 | 5.0 | 5.0 | 5.0 | 5.0 |
| Ethylene glycol (17.8) | | | | | | | | | | | |
| 1,3-Propanediol (16.1) | | | | | | | | | | | |
| 1,2,6-Hexanetriol (16.0) | | | | | | | | | | | |
| Triethylene glycol (13.6) | 5.0 | 5.0 | 5.0 | 5.0 | 5.0 | 5.0 | 5.0 | 5.0 | 5.0 | 5.0 | 5.0 |
| 1,6-Hexanediol (13.5) | | | | | | | | | | | |
| 1,2-Hexanediol (13.4) | 5.0 | 5.0 | 5.0 | 5.0 | 5.0 | 5.0 | 5.0 | 5.0 | 5.0 | 5.0 | 5.0 |
| Ethylene urea (12.6) | 5.0 | 5.0 | 5.0 | 5.0 | 5.0 | 5.0 | 5.0 | 5.0 | 5.0 | 5.0 | 5.0 |
| 2-Pyrrolidone (11.2) | 5.0 | 5.0 | 5.0 | 5.0 | 5.0 | 5.0 | 5.0 | 5.0 | 5.0 | 5.0 | 5.0 |
| γ-Butyrolactone (10.5) | | | | | | | | | | | |
| Triethylene glycol monobutyl ether (10.3) | | | | | | | | | | | |
| Polyethylene glycol 1,000 (10.1) | | | | | | | | | | | |
| N-Methyl-2-pyrrolidone (10.1) | | | | | | | | | | | |
| Tetraethylene glycol dimethyl ether (8.6) | | | | | | | | | | | |
| Diethylene glycol diethyl ether (8.2) | | | | | | | | | | | |
| NIKKOL BC-20 | 0.5 | 0.5 | 0.5 | 0.5 | 0.5 | 0.5 | 0.5 | 0.5 | 0.5 | 0.5 | 0.5 |
| NIKKOL BO-50 | | | | | | | | | | | |
| Acetylenol E100 | 0.2 | 0.2 | 0.2 | 0.2 | 0.2 | 0.2 | 0.2 | 0.2 | 0.2 | 0.2 | 0.2 |
| Ion-exchanged water | 34.3 | 34.3 | 34.3 | 34.3 | 34.3 | 34.3 | 34.3 | 34.3 | 34.3 | 34.3 | 34.3 |
| Content A | 4.0 | 0.0 | 0.0 | 0.0 | 0.0 | 0.0 | 0.0 | 0.0 | 0.0 | 0.0 | 0.0 |
| Content B | 0.0 | 4.0 | 4.0 | 4.0 | 4.0 | 4.0 | 4.0 | 4.0 | 0.0 | 0.0 | 0.0 |
| Content S | 20.0 | 20.0 | 20.0 | 20.0 | 20.0 | 20.0 | 20.0 | 20.0 | 20.0 | 20.0 | 20.0 |
| A/(A + B) | 1.0 | 0.0 | 0.0 | 0.0 | 0.0 | 0.0 | 0.0 | 0.0 | — | — | — |
| S/(A + B) | 5.0 | 5.0 | 5.0 | 5.0 | 5.0 | 5.0 | 5.0 | 5.0 | — | — | — |

TABLE 2-5

Compositions and characteristics of inks

| | Comparative Example | | | | | | | | | | |
|---|---|---|---|---|---|---|---|---|---|---|---|
| | 12 | 13 | 14 | 15 | 16 | 17 | 18 | 19 | 20 | 21 | 22 |
| Pigment dispersion liquid 1 | 20.0 | 20.0 | 20.0 | | 1.0 | 38.0 | 20.0 | 20.0 | 20.0 | 20.0 | |
| Pigment dispersion liquid 2 | | | | | | | | | | | |
| Pigment dispersion liquid 3 | | | | 20.0 | | | | | | | |
| Pigment dispersion liquid 4 | | | | | | | | | | | |
| Pigment dispersion liquid 5 | | | | | | | | | | | |
| Pigment dispersion liquid 6 | | | | | 39.0 | 2.0 | 20.0 | 20.0 | 20.0 | 20.0 | |
| Pigment dispersion liquid 7 | | | | | | | | | | | |
| Pigment dispersion liquid 8 | | | | | | | | | | | |
| Pigment dispersion liquid 9 | 20.0 | | | | | | | | | | |
| Pigment dispersion liquid 10 | | 20.0 | | | | | | | | | |
| Pigment dispersion liquid 11 | | | 20.0 | 20.0 | | | | | | | |
| C.I. Pigment Yellow 213 | | | | | | | | | | | 3.2 |
| C.I. Pigment Yellow 110 | | | | | | | | | | | 0.4 |
| Solsperse 32000 | | | | | | | | | | | 1.8 |
| PARALOID B-60 | | | | | | | | | | | 4.0 |
| Glycerin (20.0) | 5.0 | 5.0 | 5.0 | 5.0 | 5.0 | 5.0 | | 10.0 | 5.0 | 5.0 | |
| Ethylene glycol (17.8) | | | | | | | | 10.0 | 5.0 | 5.0 | |
| 1,3-Propanediol (16.1) | | | | | | | | | | 5.0 | |
| 1,2,6-Hexanetriol (16.0) | | | | | | | | | | | |
| Triethylene glycol (13.6) | 5.0 | 5.0 | 5.0 | 5.0 | 5.0 | 5.0 | | | | | |
| 1,6-Hexanediol (13.5) | | | | | | | | | | | |
| 1,2-Hexanediol (13.4) | 5.0 | 5.0 | 5.0 | 5.0 | 5.0 | 5.0 | | | | | |
| Ethylene urea (12.6) | 5.0 | 5.0 | 5.0 | 5.0 | 5.0 | 5.0 | | | | | |
| 2-Pyrrolidone (11.2) | 5.0 | 5.0 | 5.0 | 5.0 | 5.0 | 5.0 | | | | | |
| γ-Butyrolactone (10.5) | | | | | | | | | | | 25.0 |
| Triethylene glycol monobutyl ether (10.3) | | | | | | | 10.0 | | | | |
| Polyethylene glycol 1,000(10.1) | | | | | | | | | | | |
| N-Methyl-2-pyrrolidone (10.1) | | | | | | | 10.0 | | 5.0 | | |
| Tetraethylene glycol dimethyl ether (8.6) | | | | | | | | | | | 20.0 |
| Diethylene glycol diethyl ether (8.2) | | | | | | | | | | | 45.6 |
| NIKKOL BC-20 | 0.5 | 0.5 | 0.5 | 0.5 | 0.5 | 0.5 | 0.5 | 0.5 | 0.5 | 0.5 | |
| NIKKOL BO-50 | | | | | | | | | | | |
| Acetylenol E100 | 0.2 | 0.2 | 0.2 | 0.2 | 0.2 | 0.2 | 0.2 | 0.2 | 0.2 | 0.2 | |
| Ion-exchanged water | 34.3 | 34.3 | 34.3 | 34.3 | 34.3 | 34.3 | 39.3 | 39.3 | 44.3 | 44.3 | 0.0 |
| Content A | 2.0 | 2.0 | 2.0 | 0.0 | 0.1 | 3.8 | 2.0 | 2.0 | 2.0 | 2.0 | 3.2 |
| Content B | 0.0 | 0.0 | 0.0 | 2.0 | 3.9 | 0.2 | 2.0 | 2.0 | 2.0 | 2.0 | 0.0 |
| Content S | 20.0 | 20.0 | 20.0 | 20.0 | 20.0 | 20.0 | 0.0 | 0.0 | 0.0 | 0.0 | 0.0 |
| A/(A + B) | 1.0 | 1.0 | 1.0 | 0.0 | 0.03 | 1.0 | 0.5 | 0.5 | 0.5 | 0.5 | 1.0 |
| S/(A + B) | 10.0 | 10.0 | 10.0 | 10.0 | 5.0 | 5.0 | 0.0 | 0.0 | 0.0 | 0.0 | 0.0 |

Evaluations

An ink cartridge filled with each ink obtained in the foregoing was set in an ink jet recording apparatus (trade name: "PX-5600," manufactured by SEIKO EPSON CORPORATION). Then, a pattern including two kinds of yellow solid images having optical densities of 0.8 and 1.0 was recorded on a glossy paper (trade name: "Canon Photo Paper-Gloss Pro (platinum grade) PT101," manufactured by Canon Inc.). The resultant recorded product was air-dried for 24 hours and then evaluated for the following respective items. It should be noted that a spectrophotometer utilizing a CIE L*a*b* colorimetric system (trade name: "Spectrolino," manufactured by Gretag Macbeth) was used in the colorimetry of an image. The following evaluation criteria "A" and "B" corresponded to acceptable levels, and the following evaluation criteria "C" and "D" corresponded to unacceptable levels. Table 3 shows the results of the evaluations. It should be noted that a uniform solid image could not be obtained with the ink of Comparative Example 22 because the vaporization rate of the water-soluble organic solvents was slow. Accordingly, the following evaluations for color developability and lightfastness could not be performed.

Color Developability

The solid image having an optical density of 0.8 in the recorded product was evaluated for its color developability by measuring values of L*, a*, and b*, and determining its chroma C* based on the equation "$C^* = \{(L^*)^2 + (a^*)^2 + (b^*)^2\}^{1/2}$." Table 3 shows the results of the evaluation. It should be noted that evaluation criteria are as described below.

A: The chroma was 105 or more.
B: The chroma was 100 or more and less than 105.
C: The chroma was 95 or more and less than 100.
D: The chroma was less than 95.

Lightfastness

The resultant recorded product was loaded into a xenon weather meter (trade name: "XL75," manufactured by Suga Test Instruments Co., Ltd.) and then irradiated with xenon light for 700 hours under the conditions of a radiation intensity of 70,000 lux, a temperature in a tank of 25° C., and a relative humidity of 50%. The optical densities of the solid image having an optical density of 1.0 in the recorded product were measured before and after the irradiation, and then the image was evaluated for its lightfastness based on a value determined from the equation "residual ratio of optical density (%)=(optical density after irradiation/optical density before irradiation)×100." Table 3 shows the results of the evaluation. It should be noted that evaluation criteria are as described below.

A: The residual ratio of optical density was 80% or more.
B: The residual ratio of optical density was 75% or more and less than 80%.
C: The residual ratio of optical density was 70% or more and less than 75%.
D: The residual ratio of optical density was less than 70%.

TABLE 3

Results of evaluations

| | | Color developability | Lightfastness |
|---|---|---|---|
| Example | 1 | A | A |
| | 2 | A | A |
| | 3 | A | A |
| | 4 | A | A |
| | 5 | A | A |
| | 6 | A | A |
| | 7 | A | A |
| | 8 | B | B |
| | 9 | A | A |
| | 10 | A | A |
| | 11 | B | A |
| | 12 | B | A |
| | 13 | B | B |
| | 14 | A | A |
| | 15 | A | A |
| | 16 | A | A |
| | 17 | A | A |
| | 18 | A | A |
| | 19 | A | A |
| | 20 | A | A |
| | 21 | B | B |
| | 22 | A | A |
| | 23 | A | A |
| | 24 | B | B |
| | 25 | B | B |
| | 26 | A | A |
| | 27 | A | A |
| | 28 | A | A |
| | 29 | B | B |
| | 30 | B | B |
| Comparative Example | 1 | D | A |
| | 2 | A | D |
| | 3 | C | B |
| | 4 | C | B |
| | 5 | B | C |
| | 6 | A | D |
| | 7 | A | D |
| | 8 | C | B |
| | 9 | A | D |
| | 10 | B | C |
| | 11 | B | D |
| | 12 | C | A |
| | 13 | C | A |
| | 14 | C | A |
| | 15 | B | C |
| | 16 | A | C |
| | 17 | C | A |
| | 18 | C | C |
| | 19 | C | C |
| | 20 | C | C |
| | 21 | C | C |
| | 22 | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-195800, filed Sep. 8, 2011, which is hereby incorporated by reference herein in its entirety.

What is claimed is:

1. An aqueous ink comprising a first pigment and a second pigment, wherein:
the first pigment is C.I. Pigment Yellow 213;
the second pigment is at least one selected from the group consisting of C.I. Pigment Yellows 93, 128, 138, 151, 155, 180, and 215;
a content A (% by mass) of the first pigment and a content B (% by mass) of the second pigment based on a total mass of the ink satisfy a relationship of $0.1 \leq A/(A+B) \leq 0.9$; and
the ink further comprises a water-soluble organic solvent having an SP value (unit: $(cal/cm^3)^{1/2}$) determined by Fedors' method of 11.0 or more and 16.0 or less.

2. An aqueous ink according to claim 1, wherein the water-soluble organic solvent having an SP value of 11.0 or more and 16.0 or less is at least one selected from the group consisting of an alkanediol having 3 to 8 carbon atoms, ethylene urea, 2-pyrrolidone, and a polyethylene glycol having 2 to 8 carbon atoms.

3. An aqueous ink according to claim 1, wherein the content A (% by mass) of the first pigment and the content B (% by mass) of the second pigment based on the total mass of the ink satisfy a relationship of $0.2 \leq A/(A+B) \leq 0.7$.

4. An aqueous ink according to claim 1, wherein the content A (% by mass) of the first pigment, the content B (% by mass) of the second pigment, and a content S (% by mass) of the water-soluble organic solvent having an SP value of 11.0 or more and 16.0 or less based on the total mass of the ink satisfy a relationship of $1.0 \leq S/(A+B) \leq 10.0$.

5. An aqueous ink according to claim 1, further comprising a polyoxyethylene alkyl ether as a surfactant.

6. An aqueous ink according to claim 5, wherein a content (% by mass) of the surfactant is 0.05% by mass or more and 5.0% by mass or less based on a total mass of the ink.

7. An aqueous ink according to claim 1, wherein the ink is used for ink jet recording.

8. An ink cartridge comprising an ink and an ink storage portion for storing the ink,
wherein the ink comprises the aqueous ink according to claim 1.

9. An ink jet recording method comprising ejecting an ink from an ink jet recording head to record an image on a recording medium,
wherein the ink comprises the aqueous ink according to claim 1.

10. An aqueous ink according to claim 1, wherein the content (% by mass) of the first pigment in the ink is 0.05% by mass or more and 10.0% by mass or less based on the total mass of the ink.

11. An aqueous ink according to claim 1, wherein the content (% by mass) of the second pigment in the ink is 0.05% by mass or more and 10.0% by mass or less based on the total mass of the ink.

12. An aqueous ink according to claim 1, wherein the content (% by mass) of the water-soluble organic solvent having an SP value of 11.0 or more and 16.0 or less in the ink is 1.0% by mass or more and 50.0% by mass or less.

* * * * *